(12) United States Patent
Lee (10) Patent No.: US 11,576,445 B2
(45) Date of Patent: Feb. 14, 2023

(54) AIR INJECTION APPARATUS

(71) Applicant: COVER-SOMEONE CORPORATION, Seoul (KR)

(72) Inventor: Jae Ho Lee, Seoul (KR)

(73) Assignee: COVER-SOMEONE CORPORATION, Seoul (KR)

( * ) Notice: Subject to any disclaimer, the term of this patent is extended or adjusted under 35 U.S.C. 154(b) by 240 days.

(21) Appl. No.: 17/049,529

(22) PCT Filed: Jun. 14, 2018

(86) PCT No.: PCT/KR2018/006690
§ 371 (c)(1),
(2) Date: Oct. 21, 2020

(87) PCT Pub. No.: WO2019/151586
PCT Pub. Date: Aug. 8, 2019

(65) Prior Publication Data
US 2021/0251314 A1    Aug. 19, 2021

(30) Foreign Application Priority Data

Feb. 1, 2018   (KR) .......................... 10-2018-0013131

(51) Int. Cl.
*F16K 1/30* (2006.01)
*A41D 13/015* (2006.01)
*F16K 31/44* (2006.01)

(52) U.S. Cl.
CPC ............ *A41D 13/015* (2013.01); *F16K 1/307* (2013.01); *F16K 31/44* (2013.01)

(58) Field of Classification Search
CPC ............ F16K 1/307; F16K 1/36; F16K 15/20; F16K 15/205; F16K 31/445; F16K 31/50; F16K 31/504; A41D 13/0155
See application file for complete search history.

(56) References Cited

U.S. PATENT DOCUMENTS 1,353,415 A * 9/1920 Newsom ................. F16K 15/20
137/232
3,294,360 A * 12/1966 Lundberg ................. F16K 1/36
251/205

(Continued)

FOREIGN PATENT DOCUMENTS

JP       3162628 U    9/2010
KR  20-2009-0006042 U  6/2009

(Continued)

OTHER PUBLICATIONS

Translation of KR20090006042 (Year: 2022).*

*Primary Examiner* — Kelsey E Cary
(74) *Attorney, Agent, or Firm* — Bridgeway IP Law Group, PLLC; Sang Ho Lee; Hyun Woo Shin (57) ABSTRACT

An air injection apparatus is provided according to one embodiment of the present invention. The air injection apparatus includes a main body in which an air passage is formed, and an opening and closing part which is coupled to one end of the main body and in which an opening and closing protrusion having a predetermined length, protruding toward the air passage, and configured to open or close the air passage is formed on an inner surface thereof, wherein at least a part of the opening and closing protrusion may be inserted into the air passage to seal the air passage when the opening and closing part is moved in a first direction toward the main body.

6 Claims, 6 Drawing Sheets

(56) References Cited

U.S. PATENT DOCUMENTS

| | | | | | |
|---|---|---|---|---|---|
| 3,771,170 | A | * | 11/1973 | Leon | A41D 31/065 2/97 |
| 3,985,332 | A | * | 10/1976 | Walker | F16K 21/00 251/340 |
| 5,048,554 | A | * | 9/1991 | Kremer | F16K 1/305 137/69 |
| 6,089,251 | A | * | 7/2000 | Pestel | B63C 9/24 137/232 |
| 6,164,314 | A | * | 12/2000 | Saputo | F16K 15/205 137/232 |
| 7,152,617 | B1 | * | 12/2006 | Crawford | F16K 17/40 137/460 |
| 2008/0156376 | A1 | * | 7/2008 | Lin | F16K 15/20 137/223 |
| 2010/0313968 | A1 | * | 12/2010 | Lee | F16K 15/18 137/231 |
| 2014/0373946 | A1 | * | 12/2014 | Lin | F16K 17/168 137/505.19 |

FOREIGN PATENT DOCUMENTS

| KR | 10-2012-0063700 A | 6/2012 |
|---|---|---|
| KR | 10-2015-0033330 A | 4/2015 |
| KR | 10-2016-0023522 A | 3/2016 |

* cited by examiner

AIR INJECTION APPARATUS

TECHNICAL FIELD

The present invention relates to an air injection apparatus, and more specifically, to an air injection apparatus allowing air to be easily introduced into or discharged from an air tube formed in one region of an article of clothing.

BACKGROUND ART

Air injection apparatuses are used in various types of media, such as knee braces, body correction pads, belly bands, life jackets, rubber tubes, and wrist braces, to simply inject air into and discharge air from the media.

A conventional air injection apparatus includes an injection tube which is airtightly welded to and communicates with an air tube, a valve installed in the injection tube, and an opening and closing cap integrally formed therewith on an upper end of one side of the injection tube.

However, the conventional air injection apparatus has inconveniences in that, when air is injected, air should be injected using a manual pump provided separately in a state in which the opening and closing cap inserted into the injection tube is withdrawn therefrom, when the air is completely injected, the opening and closing cap should be inserted into the injection tube, and even when the air is discharged, the air should be discharged using a separate air adjustment pin.

In addition, since an apparatus such as the separate pump for injecting the air is required, it is inconvenient for a user to carry, and when the conventional air injection apparatus is installed on an article of clothing and the like, a heavy wearing sensation is felt so that the user is inconvenienced. In addition, there is a problem in that, since the opening and closing cap is sealed insufficiently, sealing of the air injected into the air tube is not performed well.

Accordingly, an air injection apparatus for solving such problems is required.

Technical Problem

The present invention is directed to providing an air injection apparatus capable of allowing an air passage connected to an air tube formed in one region of an article of clothing to be opened or closed to inject air into or discharge air from the air tube through a simple operation method.

Objectives to be solved through the present invention are not limited to the above-described objective, and other objectives which are not mentioned above will be clearly understood by those skilled in the art through the following specification.

Technical Solution

One aspect of the present invention provides an air injection apparatus according to one embodiment of the present invention. The air injection apparatus includes a main body in which an air passage is formed, and an opening and closing part which is coupled to one end of the main body and in which an opening and closing protrusion having a predetermined length, protruding toward the air passage, and configured to open or close the air passage is formed on an inner surface thereof, wherein at least a part of the opening and closing protrusion is inserted into the air passage to seal the air passage when the opening and closing part is moved in a first direction toward the main body.

At least one air injection hole may be formed to pass through one end of the opening and closing part along a circumference of the opening and closing protrusion, and when the opening and closing part is moved in a second direction opposite to the first direction, the opening and closing protrusion is withdrawn from the air passage to open the air passage, and the air passage may communicate with the outside through the air injection hole so that air is injectable or dischargeable.

The air injection apparatus may further include a connection part which is coupled to the other end of the main body and connects the air injection apparatus to a hose so that the air injection apparatus communicates with the hose, wherein the connection part includes may include a coupling part of which an inner portion is formed to be empty with two open ends and at least a part is inserted into the hose so that the hose communicates with the air passage, and a fixing part which is formed to be spaced apart from an outer circumferential surface of the coupling part and presses an outer surface of the hose coupled to the coupling part according to coupling of the connection part and the main body.

A first coupling part and a second coupling part, which are for screw-coupling, may be formed on an outer surface of one end of the main body and an inner surface of the opening and closing part, respectively, and the opening and closing part may be moved in the first direction or the second direction to open or close the air passage according to rotation of the opening and closing part.

In addition, a third coupling part and a fourth coupling part, which are for screw-coupling, may be formed on an inner surface of the other end of the main body and an outer surface of the fixing part, respectively, and the fixing part may be coupled to the other end of the main body to press the outer surface of the hose according to rotation of the connection part in one direction.

One aspect of the present invention provides a functional article of clothing according to one embodiment of the present invention. The functional article of clothing may include the air injection apparatus, the air tube through which air is introduced or discharged by the air injection apparatus, and an article of clothing in which the air injection apparatus is disposed.

At least one of the air tube and the air injection apparatus may be detachably coupled to the article of clothing.

In addition, at least one of the air tube and the air injection apparatus may be installed in the article of clothing.

Advantageous Effects

According to the present invention, since an air passage of an air injection apparatus can be opened or closed through a simple and easy method of rotating and vertically moving an opening and closing part in a longitudinal direction, air can be introduced or discharged without a separate unit so that ease of use of a user can be improved.

In addition, since air can be injected through a simple and easy method in which the user blows the air, a separate member such as a pump is not required, and thus portability for the user can be improved.

In addition, since the air injection apparatus and an air tube are disposed in an article of clothing, the article of clothing providing an improved wearing sensation can be provided, and since a volume is decreased by discharging air as necessary, a wearing sensation or activity can be improved.

In addition, since the air tube is disposed in a region, which corresponds to a joint area such as a neck and a wrist, of an article of clothing, the user may be protected from a fatigue sensation or injury due to user's activity.

DESCRIPTION OF DRAWINGS

In order to sufficiently understand drawings referenced in a detailed description of the present invention, brief descriptions of the drawings are provided.

MODES OF THE INVENTION

Hereinafter, embodiments of the present invention will be described with reference to the accompanying drawings. When reference numerals are assigned to components of each drawing, it should be noted that, even when the same components are illustrated in different drawings, the same numerals are assigned to the same components whenever possible. In addition, in the descriptions of the embodiments of the present invention, when specific descriptions of related well-known technologies or functions are deemed to unnecessarily obscure the understanding of the embodiments of the present invention, they will be omitted. In addition, although the embodiments of the present invention will be described below, the technical spirit of the present invention will not be limited thereto and may be variously modified and implemented by those skilled in the art.

Throughout this specification, when a part is referred to as being "connected" to another part, it includes being "directly connected" and "indirectly connected" via an intervening part. Also, when a certain part "includes" a certain component, this does not exclude other components unless explicitly described otherwise, and other components may in fact be included. In addition, in descriptions of components of the embodiments of the present invention, terms such as "first," "second," "A," "B," "(a)" and "(b)" can be used. The terms are only to distinguish one element from another element, and essence, order, the number, and the like of the elements are not limited to the terms.

Figure 1:
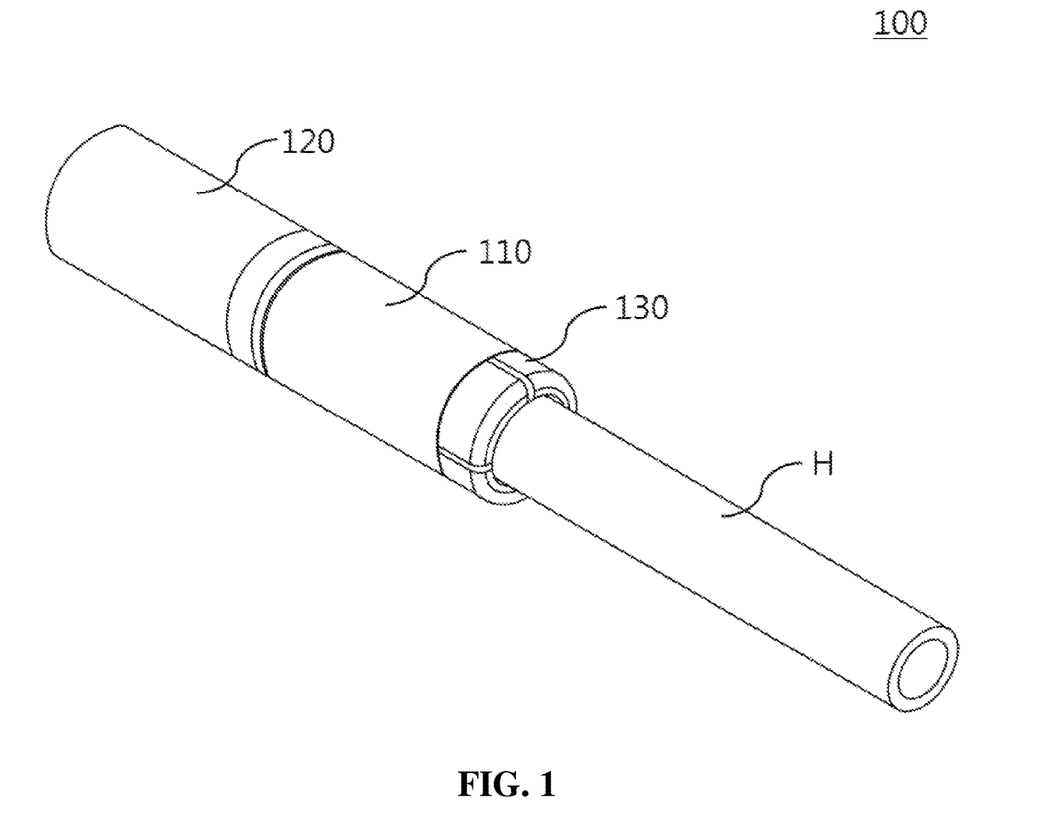
FIG. 1 is a view illustrating an air injection apparatus according to one embodiment of the present invention.
Figure 2:
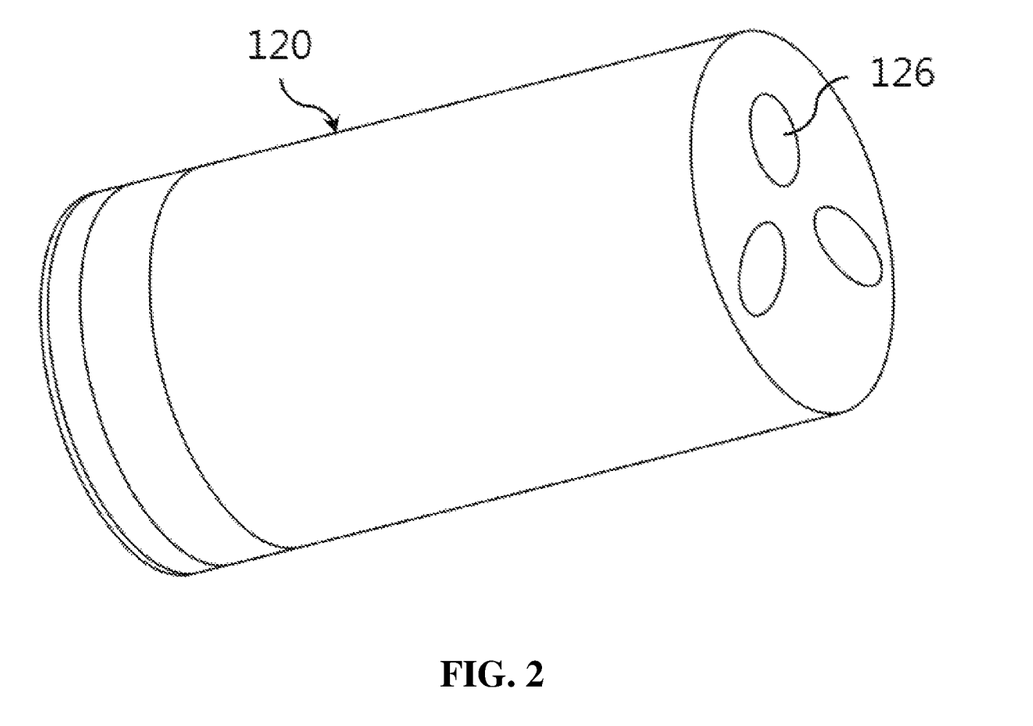
FIG. 2 is a view illustrating an opening and closing part of the air injection apparatus according to one embodiment of the present invention.
Figure 3:
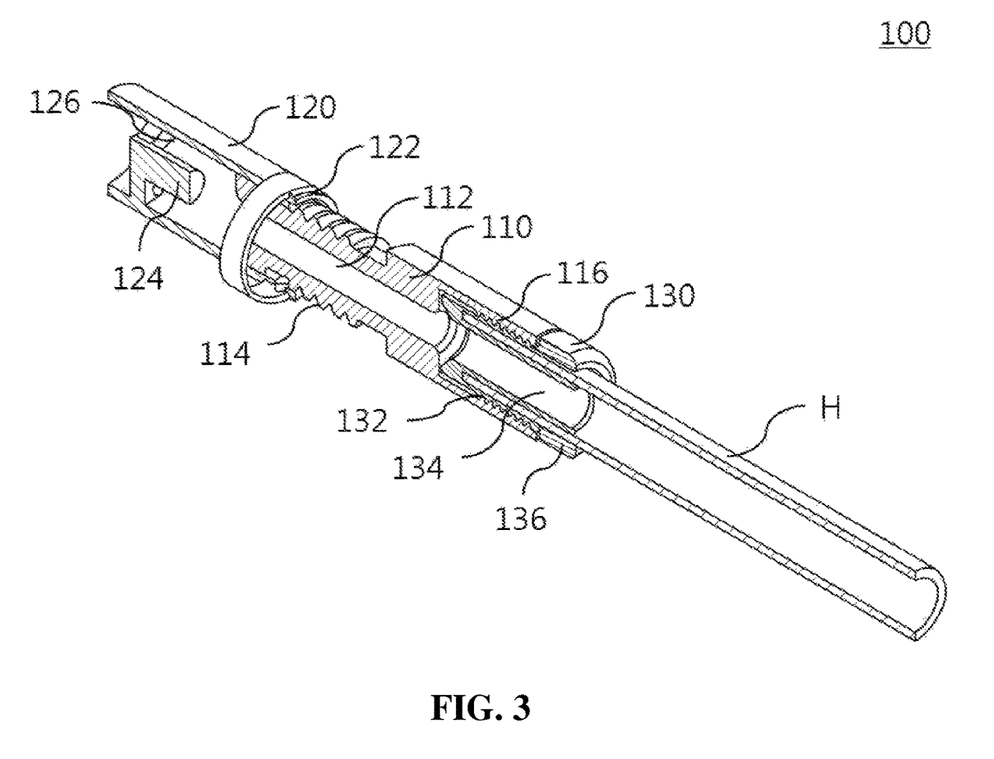
FIG. 3 is a cross-sectional view illustrating the air injection apparatus according to one embodiment of the present invention.

FIG. 1 is a view illustrating an air injection apparatus according to one embodiment of the present invention, FIG. 2 is a view illustrating an opening and closing part of the air injection apparatus according to one embodiment of the present invention, and FIG. 3 is a cross-sectional view illustrating the air injection apparatus according to one embodiment of the present invention.

Here, an air injection apparatus 100 refers to an apparatus configured to inject air into or discharge air from an air tube 200 formed in at least one region of an article of clothing 300. That is, the air injection apparatus 100 may communicate with the air tube 200 formed in the article of clothing 300 through a hose H, and the air tube 200 may be expanded or contracted according to the air injected into or discharged from the air injection apparatus 100.

Referring to FIGS. 1 to 3, the air injection apparatus 100 may include a main body 110, an opening and closing part 120, and a connection part 130.

Both ends of the main body 110 are open, and an air passage 112 may be formed from one end to the other end of the main body 110. The opening and closing part 120 and the connection part 130 may be coupled and connected to both ends of the main body 110. Accordingly, inner portions of the main body 110, the opening and closing part 120, and the connection part 130 integrally communicate with each other so that air in the air injection apparatus 100 may be freely introduced thereinto and discharged therefrom according to an operation of the opening and closing part 120.

In this case, a first coupling part 114 having a thread shape may be formed in one region of the main body 110 along an outer circumferential surface of the main body 110. In addition, the opening and closing part 120 includes a second coupling part 122, of which at least one protrusion is formed inward, so as to be insertable into the first coupling part 114, and the second coupling part 122 may be inserted into the first coupling part 114 positioned at a corresponding position according to a rotation operation of the opening and closing part 120. Accordingly, since movement of the opening and closing part 120 in a longitudinal direction is prevented, an airtight or open state of the air injection apparatus 100 may be maintained. In some embodiments, the first coupling part 114 may be formed to have a plurality of grooves formed to be spaced apart from each other in the longitudinal direction along the outer circumferential surface of the main body 110. In this case, since the second coupling part 122 is inserted into the grooves, movement of the opening and closing part 120 may be prevented, but the present invention is not limited thereto.

In addition, a third coupling part 116 having a thread shape may be formed in the other region of the main body 110 along the inner circumferential surface of the main body 110, and a fourth coupling part 132 having a thread shape may be formed in the connection part 130 along an outer circumferential surface of the connection part 130 to correspond to the third coupling part 116. Accordingly, the third coupling part 116 and the fourth coupling part 132 may be screw-coupled according to rotation of the connection part 130 in one direction to firmly couple the main body 110 to the connection part 130.

The opening and closing part 120 may be coupled to one end of the main body 110 and operated in the longitudinal direction of the air injection apparatus 100 to open or close the air passage 112 of the main body 110. To this end, an opening and closing protrusion 124 protruding toward the main body 110 may be formed on an inner surface of one end of the opening and closing part 120. Accordingly, as the opening and closing part 120 is moved in the longitudinal direction, the opening and closing protrusion 124 is inserted into or withdrawn from the air passage 112, and thus the air passage 112 of the main body 110 may be opened or closed. The opening and closing protrusion 124 may be formed to have a size corresponding to an inner diameter of the main body 110 to seal the air passage 112.

In addition, at least one air injection hole 126 may be formed along a circumference of the opening and closing protrusion 124 to pass through the opening and closing protrusion 124. Accordingly, when the opening and closing protrusion 124 is withdrawn from the air passage 112, the air passage 112 may communicate with the outside through the air injection hole 126, and the user may inject air into the air tube 200 through the air injection hole 126 or discharge air remaining in the air tube 200 through the air injection hole 126.

The connection part 130 may be coupled to the other end of the main body 110 to communicate with the main body 110 and the opening and closing part 120. In addition, the connection part 130 may be connected to one end of the hose H to be disposed between and connected to the air injection apparatus 100 and the air tube 200 so that the air injection apparatus 100 communicates with the air tube 200. To this end, the connection part 130 may include a coupling part 134 and a fixing part 136 formed to be spaced apart from an outer circumferential surface of the coupling part 134. First, as an inner portion of the coupling part 134 is formed to be empty with two open ends and at least a part of the coupling part 134 is inserted into the hose H, the inner portion of the connection part 130 may communicate with the hose H. The fixing part 136 may be formed to be spaced apart from the outer circumferential surface of the coupling part 134 and may press an outer surface of the hose H connected to the coupling part 134 so as to prevent separation of the hose H. That is, when the coupling part 134 is inserted into the hose H, one end of the hose H is positioned in a separation gap between the coupling part 134 and the fixing part 136, and the main body 110 is coupled to an outer circumferential surface of the fixing part 136 to press one end of the hose H so that undesired separation of the hose H from the coupling part 134 is prevented.

The air injection apparatus 100 illustrated in FIGS. 1 to 3 is exemplary, and various air injection apparatuses may be made according to embodiments to which the present invention is applied. For example, the connection part 130 and the main body 110 may be integrally formed, or at least one position among positions of the main body 110, the opening and closing part 120, and the connection part 130 may be changed.

Figure 4A:
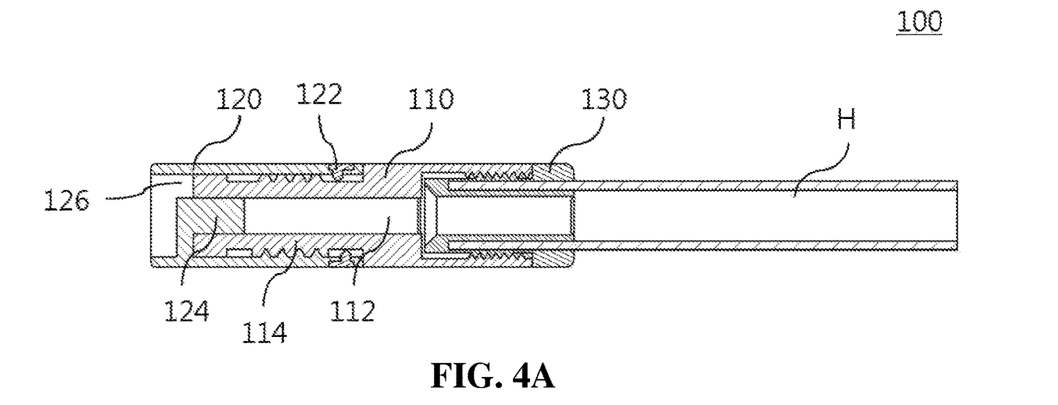
FIGS. 4A and 4B are views illustrating an operation state of the air injection apparatus according to one embodiment of the present invention.
Figure 4B:
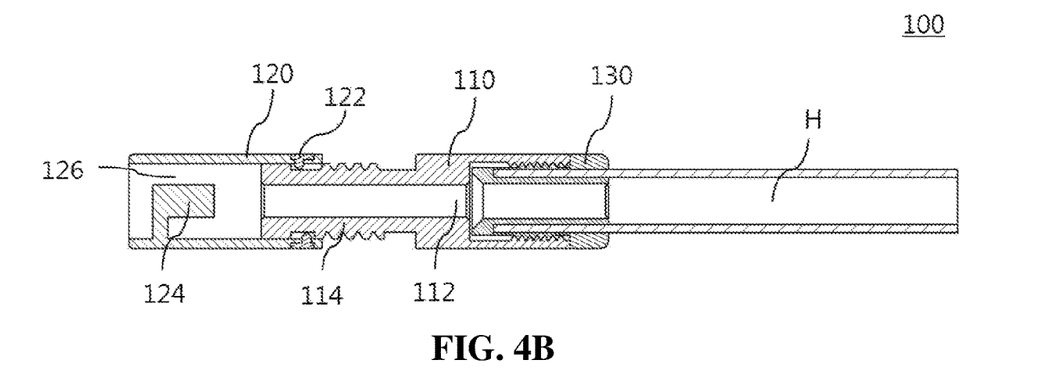

FIGS. 4A and 4B are views illustrating an operation state of the air injection apparatus according to one embodiment of the present invention.

First, referring to FIG. 4A, a state in which the air passage 112 of the air injection apparatus 100 is sealed is illustrated. As the opening and closing part 120 is rotated in one direction, the opening and closing part 120 is moved in a first direction toward the main body 110 so that the second coupling part 122 may be moved in the first direction and the opening and closing protrusion 124 may be inserted into the air passage 112. Accordingly, when the air injection apparatus 100 is not used, the air passage 112 may be sealed to prevent air from being discharged from the air tube 200.

In addition, referring to FIG. 4B, the opening and closing part 120 is rotated in the other direction opposite to one direction to open the air passage 112 of the air injection apparatus 100 to be moved in a second direction opposite to the first direction so that the opening and closing protrusion 124 may be withdrawn from the air passage 112. As the opening and closing part 120 is moved in the second direction, the hose H communicates with the air injection hole 126 so that external air may be injected into or withdrawn from the air tube 200.

However, the operation of the air injection apparatus 100 is merely exemplary, and the present invention may be variously modified and applied according to embodiments to which the present invention is applied by those skilled in the art.

Figure 5A:
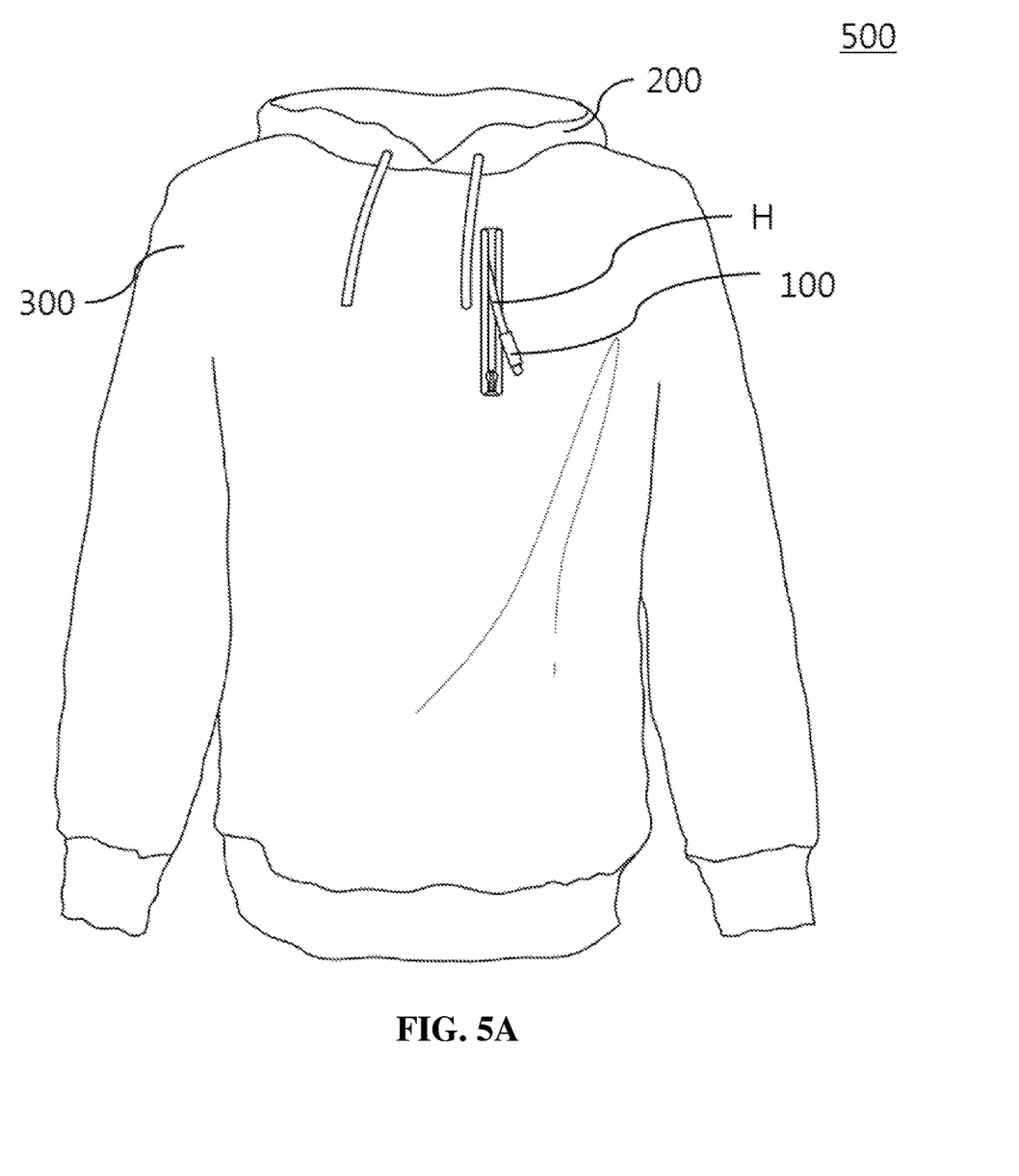
FIGS. 5A and 5B are view illustrating a functional article of clothing according to one embodiment of the present invention.
Figure 5B:
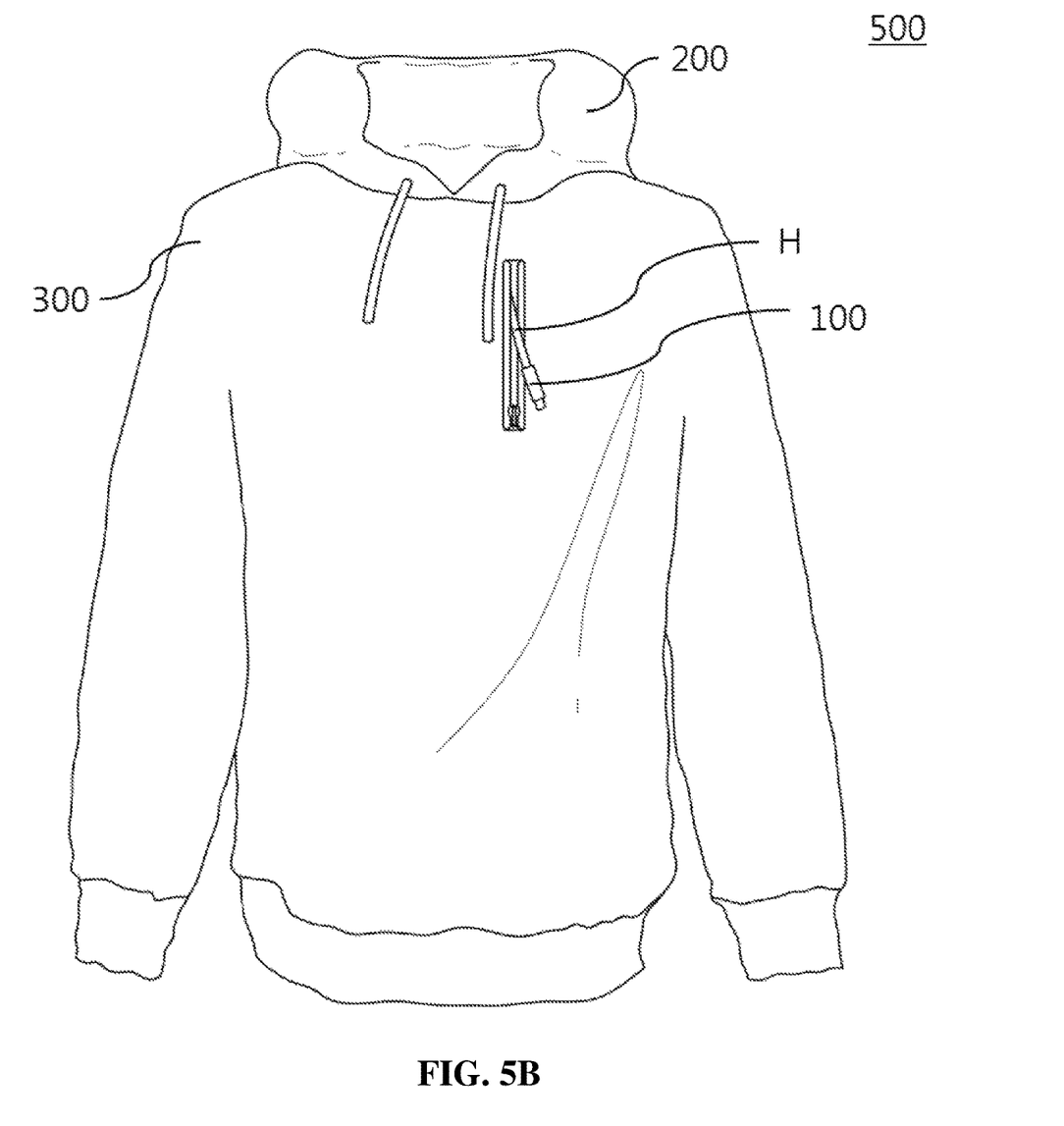

FIGS. 5A and 5B are view illustrating a functional article of clothing according to one embodiment of the present invention.

Specifically, in FIG. 5A, a functional article of clothing 500 is illustrated in a state in which air in the air tube 200 is discharged, and in FIG. 5B, the functional article of clothing 500 is illustrated in a state in which air is introduced into the air tube 200.

As illustrated in the drawings, the functional article of clothing 500 may include the air injection apparatus 100, the air tube 200 and the article of clothing 300.

The air tube 200 may be provided to be detachably attached to an inner/outer side of the article of clothing 300. The air injection apparatus 100 may be detachably connected to the air tube 200 to introduce or discharge air into or from the air tube 200, and in this case, the air tube 200 may include the hose H so that air flows to the air tube 200. Accordingly, the air may be introduced into and discharged from the air tube 200 using the air injection apparatus 100, and a cushion sensation may be felt from one region of the article of clothing 300.

Specifically, the connection part 130 of the air injection apparatus 100 may be connected to the hose H so that the air flows to the air tube 200, and the air passage 112 of the air injection apparatus 100 may be opened or closed according to the operation of the opening and closing part 120. In a case in which the air passage 112 is opened, the user may introduce air into the air tube 200 from the air injection hole 126 of the opening and closing part 120 through the air passage 112, or conversely, may discharge air to the opening and closing part 120 from the air tube 200. Conversely, in a case in which the air passage 112 is sealed, a state in which air is injected into or discharged from the air tube 200 may be maintained.

In addition, the article of clothing 300 may be formed as an upper or lower article of clothing that the user may wear but is not limited thereto and may be any form of an article of clothing or an accessory having that the user can wear.

As illustrated in the drawings, the air tube 200 may be formed in a region corresponding to a neck, but this is exemplary, and the air tube 200 may be formed at any region for absorbing an external impact or supporting a posture of an joint area such as a wrist and a knee. Accordingly, the air tube 200 may be expanded according to air injection performed by the air injection apparatus 100 to provide a cushion sensation of one region of the article of clothing so as to protect the user from a fatigue sensation or injury due to a user's activity. In addition, since air injected into the air tube 200 may be discharged according to a need of the user, a user's wearing sensation or activity may be improved.

The exemplary embodiments have been disclosed with reference to the drawings and the specification as described above. Although the specific terms have been used in this specification, the terms are used to only describe the present invention but not to limit the meanings or the scope of the present invention defined by the claims. Therefore, it will be understood by those skilled in the art that various modifications and equivalent other example embodiments may be made. Therefore, the scope of the present invention is defined by the appended claims.

The invention claimed is:

1. An air injection apparatus comprising:
   a main body in which an air passage is formed; and
   an opening and closing part coupled to one end of the main body and comprising an opening and closing protrusion disposed on an inner surface of the opening and closing part, wherein the opening and closing protrusion has a predetermined length, protrudes toward the air passage, and is configured to open or close the air passage, wherein at least a part of the opening and closing protrusion is configured to be inserted into the air passage to seal the air passage when the opening and closing part is moved in a first direction toward the main body, wherein the air injection apparatus further comprises a connection part coupled to another end of the main body and connecting the air injection apparatus to a hose so that the air injection apparatus communicates with the hose, wherein the connection part comprises:

a coupling part having an empty inner portion with two open ends, wherein at least a part of the coupling part is inserted into the hose so that the hose communicates with the air passage; and a fixing part formed to be spaced apart from an outer circumferential surface of the coupling part and pressing an outer surface of the hose coupled to the coupling part according to coupling of the connection part and the main body, wherein a first coupling part and a second coupling part, which are for screw-coupling, are formed on an inner surface of the another end of the main body and an outer surface of the fixing part, respectively, and wherein the fixing part is coupled to the another end of the main body to press the outer surface of the hose according to rotation of the connection part in one direction.

2. The air injection apparatus of claim 1, wherein:

at least one air injection hole is formed to pass through one end of the opening and closing part along a circumference of the opening and closing protrusion; and when the opening and closing part is moved in a second direction opposite to the first direction, the opening and closing protrusion is withdrawn from the air passage to open the air passage, and the air passage communicates with an outside through the air injection hole so that air is injectable or dischargeable.

3. The air injection apparatus of claim 2, wherein:

a third coupling part and a fourth coupling part, which are for screw-coupling, are formed on an outer surface of the one end of the main body and an inner surface of the opening and closing part, respectively; and the opening and closing part is moved in the first direction or the second direction to open or close the air passage according to rotation of the opening and closing part.

4. An article of clothing, comprising:

the air injection apparatus according to claim 1 disposed in the article of clothing;

an air tube through which air is introduced or discharged by the air injection apparatus.

5. The article of clothing of claim 4, wherein at least one of the air tube and the air injection apparatus is detachably coupled to the article of clothing.

6. The article of clothing of claim 4, wherein at least one of the air tube and the air injection apparatus is installed in the article of clothing.

* * * * *